United States Patent
Holland et al.

(10) Patent No.: US 9,747,658 B2
(45) Date of Patent: Aug. 29, 2017

(54) ARBITRATION METHOD FOR MULTI-REQUEST DISPLAY PIPELINE

(71) Applicant: Apple Inc., Cupertino, CA (US)

(72) Inventors: Peter F. Holland, Los Gatos, CA (US); Albert C. Kuo, Mountain View, CA (US); Hao Chen, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 682 days.

(21) Appl. No.: 14/019,909

(22) Filed: Sep. 6, 2013

(65) Prior Publication Data
US 2015/0070365 A1    Mar. 12, 2015

(51) Int. Cl.
*G06T 1/20*    (2006.01)

(52) U.S. Cl.
CPC ..................... *G06T 1/20* (2013.01)

(58) Field of Classification Search
CPC ....... G06F 13/1615; G06F 3/14; G09G 5/001; G09G 5/363; G06T 3/0093
See application file for complete search history.

(56) References Cited

U.S. PATENT DOCUMENTS

| | | | | | |
|---|---|---|---|---|---|
| 4,829,295 | A | * | 5/1989 | Hiroyuki | G09G 5/42 345/13 |
| 4,970,636 | A | * | 11/1990 | Snodgrass | G06T 15/30 345/421 |
| 5,175,731 | A | * | 12/1992 | Suarez | G06F 3/14 370/462 |
| 5,530,481 | A | * | 6/1996 | De With | H04N 19/51 348/699 |
| 5,574,847 | A | * | 11/1996 | Eckart | G06T 1/20 345/505 |
| 5,600,346 | A | * | 2/1997 | Kamata | G09G 5/14 715/804 |
| 5,889,949 | A | * | 3/1999 | Charles | G09G 5/39 348/E11.021 |
| 6,002,391 | A | * | 12/1999 | Ito | G09G 5/14 345/204 |
| 6,184,906 | B1 | * | 2/2001 | Wang | G06F 3/14 345/506 |
| 6,222,550 | B1 | * | 4/2001 | Rosman | G06T 15/005 345/419 |
| 6,628,243 | B1 | * | 9/2003 | Lyons | G06F 3/1431 345/1.1 |
| 6,987,517 | B1 | * | 1/2006 | Donovan | G06T 15/04 345/552 |

(Continued)

*Primary Examiner* — Gregory J Tryder
*Assistant Examiner* — Jitesh Patel
(74) *Attorney, Agent, or Firm* — Meyertons, Hood, Kivlin, Kowert & Goetzel, P.C.

(57) ABSTRACT

Embodiments of an apparatus and method are disclosed that may allow for arbitrating multiple read requests to fetch pixel data from a memory. The apparatus may include a first and a second processing pipeline, and a control unit. Each of the processing pipelines may be configured to generate a plurality of read requests to fetch a respective one of a plurality of portions of stored pixel data. The control unit may be configured to determine a priority for each read request dependent upon display coordinates of one or more pixels corresponding to each of the plurality of portions of stored pixel data, and determine an order for the plurality of read requests dependent upon the determined priority for each read request.

15 Claims, 5 Drawing Sheets

(56) References Cited

U.S. PATENT DOCUMENTS

| | | | |
|---|---|---|---|
| 7,593,018 B1* | 9/2009 | Toksvig | G06T 15/04 345/582 |
| 7,688,325 B1* | 3/2010 | Sreenivas | G09G 5/39 345/534 |
| 7,710,425 B1* | 5/2010 | Baldwin | G06T 1/60 345/538 |
| 7,777,749 B2 | 8/2010 | Chung et al. | |
| 7,979,683 B1 | 7/2011 | Danskin et al. | |
| 8,108,625 B1* | 1/2012 | Coon | G06F 9/46 711/127 |
| 8,111,260 B2 | 2/2012 | Srinivasan et al. | |
| 8,533,403 B1* | 9/2013 | Law | G06F 13/1605 711/105 |
| 8,922,571 B2* | 12/2014 | Tripathi | G09G 5/026 345/204 |
| 2002/0149626 A1* | 10/2002 | Ozcelik | G09G 5/06 715/781 |
| 2003/0005253 A1* | 1/2003 | Liao | G06F 13/1642 711/169 |
| 2003/0160789 A1* | 8/2003 | Tang | G09G 5/363 345/440 |
| 2004/0001163 A1* | 1/2004 | Park | H04N 21/4312 348/569 |
| 2004/0100471 A1* | 5/2004 | Leather | G06T 1/20 345/506 |
| 2004/0225787 A1* | 11/2004 | Ma | G06F 15/17375 710/260 |
| 2004/0233208 A1* | 11/2004 | Hussain | G06T 1/20 345/557 |
| 2004/0252126 A1* | 12/2004 | Margittai | G06T 15/04 345/535 |
| 2005/0012759 A1* | 1/2005 | Valmiki | G06T 9/007 345/629 |
| 2005/0122341 A1* | 6/2005 | MacInnis | G06T 9/007 345/558 |
| 2006/0192983 A1* | 8/2006 | Groarke | G06F 3/1212 358/1.9 |
| 2007/0041054 A1* | 2/2007 | Kakutani | H04N 1/4105 358/3.16 |
| 2007/0101330 A1* | 5/2007 | Aizawa | G06F 9/4812 718/100 |
| 2007/0165035 A1* | 7/2007 | Duluk | G06T 1/60 345/506 |
| 2007/0216700 A1* | 9/2007 | Chen | G09G 5/14 345/581 |
| 2008/0037902 A1* | 2/2008 | Matsumoto | G06T 3/40 382/299 |
| 2008/0049031 A1* | 2/2008 | Liao | G06T 15/005 345/530 |
| 2008/0222332 A1* | 9/2008 | Lee | G06F 3/14 710/244 |
| 2008/0313434 A1* | 12/2008 | Naoi | G06F 9/526 712/216 |
| 2009/0122084 A1* | 5/2009 | Yu | G06T 3/4007 345/660 |
| 2009/0324200 A1* | 12/2009 | Akao | G11B 27/28 386/248 |
| 2010/0057963 A1* | 3/2010 | Tsuji | G06F 12/00 710/116 |
| 2010/0066739 A1 | 3/2010 | Ishibashi | |
| 2011/0154189 A1* | 6/2011 | Yano | H04N 1/00442 715/251 |
| 2012/0013624 A1* | 1/2012 | Fowler | G06T 11/40 345/520 |
| 2012/0131306 A1* | 5/2012 | Bratt | G06F 12/1027 711/205 |
| 2012/0163732 A1* | 6/2012 | Hoshino | G06T 3/40 382/284 |
| 2012/0269390 A1* | 10/2012 | Osa | G06K 9/00255 382/103 |

* cited by examiner

ARBITRATION METHOD FOR MULTI-REQUEST DISPLAY PIPELINE

BACKGROUND

Technical Field

This disclosure relates generally to processing video input for display, and more specifically to methods for arbitrating multiple requests for pixel source data.

Description of the Related Art

Part of the operation of many computer systems, including portable digital devices such as mobile phones, notebook computers and the like, is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel." For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. To represent a specific color on an electronic display, each pixel may have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Most graphics systems use frame buffers to store the pixels for image and video frame information. The term "frame buffer" often denotes the actual memory used to hold picture/video frames. The information in a frame buffer typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The total amount of the memory required for frame buffers to store image/video information depends on the resolution of the output signal, and on the color depth and palette size. The High-Definition Television (HDTV) format, for example, is composed of up to 1080 rows of 1920 pixels per row, or almost 2.1M pixels per frame.

Various display formats are in common use today for computing devices to connect to electronic displays, including, but not limited to, older standards such as VGA and DVI, and more modern standards such as HDMI and DisplayPort. In addition, new standards are being developed such as, for example, HDBaseT. These various formats have various data resolution requirements, resulting in some formats using more data bits per pixel than others. In order to provide a high quality picture to all formats, an apparatus as discussed above may process all graphical data with enough data bits for the supported display format requiring the highest resolution. This leaves the apparatus responsible for removing data bits in order to support the other formats which use lower resolutions.

SUMMARY OF EMBODIMENTS

Various embodiments of methods and devices for read requests to fetch pixel data are disclosed. Broadly speaking an apparatus and method are contemplated in which the apparatus includes a first processing pipeline, a second processing pipeline, and a control unit. The first and second processing pipelines may be configured to each generate a plurality of read requests to fetch a respective one of a plurality of portions of stored pixel data. The control unit may be configured to determine a priority for each read request dependent upon display coordinates of one or more pixels included in each one of the respective plurality of portions of stored pixel data, and determine an order for the plurality of read requests dependent upon the determined order for each read request.

In another embodiment, each of the first and second processing pipelines may be further configured to assign an initial priority to each generated read request. The control unit may be further configured to determine a priority for each request dependent upon the assigned initial priorities.

In other embodiments, the control unit may be further configured to determine a pixel with a smallest display coordinate for each pixel in each read request. The control unit may be further configured to calculate the display coordinate for the determined pixel.

Figure 1:
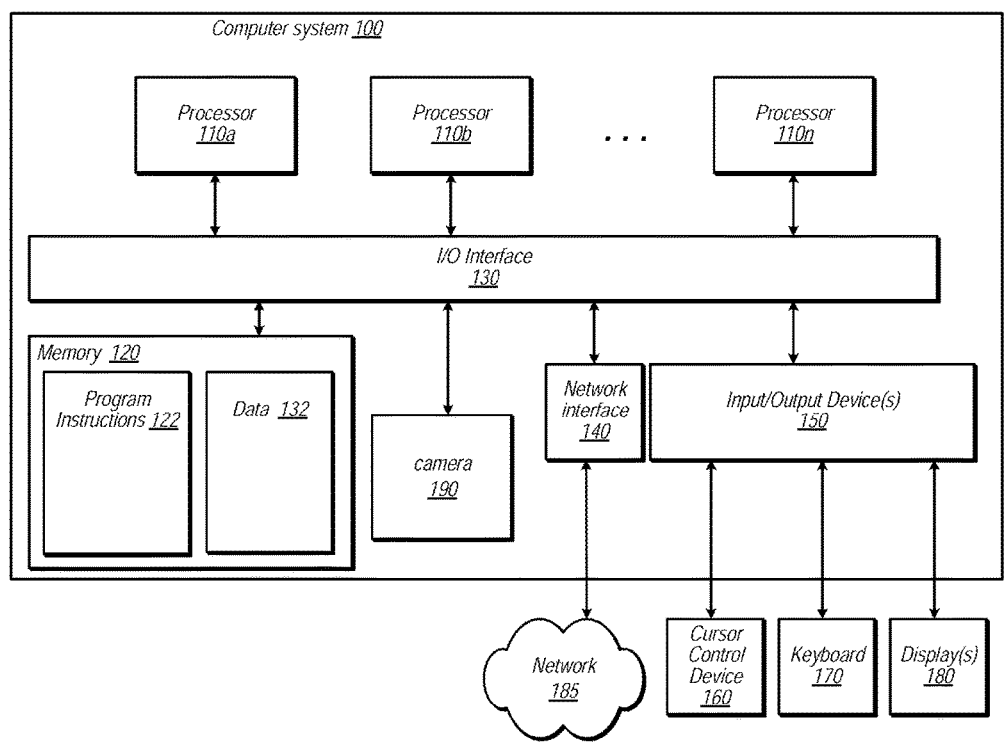
FIG. 1 illustrates a block diagram of an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Typically, raw video is received by an apparatus (e.g., an integrated circuit (IC), such as a system-on-a-chip (SOC), or a package such as a multi-chip module (MCM)) of a computer system in a format that is not directly compatible with the electronic display to which a display controller of the apparatus outputs frames to be displayed. In addition, the display controller may not accept the raw video format as input. Thus, at least some processing of input video may be performed by the apparatus to convert the video input into a display-compatible format before outputting the video frames to the electronic display for viewing. For example, the apparatus may be used to convert the video input from a raw video format (e.g., YUV420/1080p) to electronic display (e.g., ARGB) format frames of an appropriate size for viewing prior to feeding the video frames to the display controller. The display controller may perform additional rendering of the frames prior to feeding the frames to the electronic display.

In addition, there may be other graphical content, for example user interface graphics or objects, that may be input to the apparatus for processing and displaying to the electronic display. One or more video input streams and one or more of these other graphical input sources may be input for display concurrently. For example, a user may be watching a video on the computer system, and the operating system (OS) of the computer system or an application on the device may, during the video generate a notification or other user interface element that needs to be presented on the electronic display. Thus, in addition to video processing, another function that may be performed by the apparatus is combining these different graphical inputs such as, e.g., a video stream and one or more Graphical User-Interface (GUI) elements, into output frames to be presented on the electronic display simultaneously. This function may be referred to as window compositing.

Various display formats are in common use today for computer systems to connect to electronic displays. These various formats have various data resolution requirements, resulting in some formats using more data bits per pixel than others. In order to provide a high quality picture to all formats, an apparatus as discussed above may process all graphical data with enough data bits for the supported display format requiring the highest resolution. This leaves the apparatus responsible for removing data bits in order to support the other formats which use lower resolutions.

When processing the various display formats, it may be necessary to retrieve multiple pixels or portions of stored image data. Display processors may generate read requests in order to fetch data from memory. Various display processors may have multiple processing pipelines which may simultaneously generate read requests. The order in which the various generated read requests are serviced may impact performance on a display processor. The embodiments illustrated in the drawings and described below may provide techniques for arbitrating among various read requests which may result in improved performance of a display processor.

A block diagram of an embodiment of a computing system is illustrated in FIG. 1. In different embodiments, computer system 100 may be any of various types of devices, including, but not limited to, a desktop computer, laptop, tablet or pad device, mainframe computer system, workstation, a camera, a set top box, a mobile device, a mobile phone, a consumer device, video game console, handheld video game device, or any general type of computing or electronic device.

In the illustrated embodiment, computer system 100 includes one or more processors 110 coupled to system memory 120 via input/output (I/O) interface 130. Computer system 100 further includes network interface 140 coupled to I/O interface 130, and one or more input/output devices 150, such as cursor control device 160, keyboard 170, and display(s) 180. Computer system 100 may also include one or more cameras 190, which may also be coupled to I/O interface 130. At least one of cameras 190 may be operable to capture video sequences.

Although computer system 100 depicts a multiple processors (commonly referred to as a "multiprocessor system"), in other embodiments, a single processor may be employed. Processors 110 may be any suitable processor capable of executing instructions. For example, in various embodiments processors 110 may be general-purpose or embedded processors implementing any of a variety of Instruction Set Architectures (ISAs), such as the x86, PowerPC, SPARC, or MIPS ISAs, or any other suitable ISA. In multiprocessor systems, each of processors 110 may commonly, but not necessarily, implement the same ISA.

System memory 120 may be configured to store program instructions 122 and/or data 132 accessible by processor 110. In various embodiments, system memory 120 may be implemented using a variety of memory technologies, such as, e.g., Static Random Access Memory (SRAM), Synchronous Dynamic Random Access Memory (SDRAM), non-volatile memory, or any other suitable type of memory. In the illustrated embodiment, program instructions 122 may be configured to implement various interfaces, methods and/or data, such, e.g., drivers, for controlling operations of an apparatus implementing embodiments of multiple video processing modes and embodiments of image compression techniques. Although only a single memory is illustrated in computing system 100, in some embodiments, different numbers and different configurations of memories may be employed.

In one embodiment, I/O interface 130 may be configured to coordinate I/O traffic between processor 110, system memory 120, and any peripheral devices in the device, including network interface 140 or other peripheral interfaces, such as input/output devices 150. In some embodiments, I/O interface 130 may perform any necessary protocol, timing or other data transformations to convert data signals from one component such as, e.g., system memory 120, into a format suitable for use by another component such as, processor 110, for example. In some embodiments, I/O interface 130 may include support for devices attached through various types of peripheral buses, such as a variant of the Peripheral Component Interconnect (PCI) bus standard or the Universal Serial Bus (USB) standard, for example. In some embodiments, the function of I/O interface 130 may be split into two or more separate components, such as a north bridge and a south bridge, for example. Also, in some embodiments some or all of the functionality of I/O interface 130, such as an interface to system memory 120, may be incorporated directly into processor 110.

Network interface 140 may be configured to allow data to be exchanged between computer system 100 and other devices attached to a network 185 (e.g., carrier or agent devices) or between nodes of computer system 100. Network 185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 140 may support communication via wired or wireless general data networks, such as, e.g., any suitable type of Ethernet network, via telecommunications/telephony networks such as analog voice networks or digital fiber communications networks; via storage area networks such as Fiber Channel SANs, or via any other suitable type of network and/or protocol.

Input/output devices 150 may, in some embodiments, include one or more display terminals, keyboards, keypads, touchpads, scanning devices, voice or optical recognition devices, or any other devices suitable for entering or accessing data by computer system 100. Multiple input/output devices 150 may be present in computer system 100 or may be distributed on various nodes of computer system 100. In some embodiments, similar input/output devices may be separate from computer system 100 and may interact with one or more nodes of computer system 100 through a wired or wireless connection, such as over network interface 140.

As shown in FIG. 1, system memory 120 may include program instructions 122, which may be processor-executable to implement any element or action to support operations of circuit blocks implementing embodiments of multiple video processing modes and embodiments of image compression techniques. In at least some embodiments, images or video captured by a camera 190 may be stored to system memory 120. In addition, metadata for images or video captured by a camera 190 may be stored to system memory 120. Video streams stored to system memory 120 may, for example, be processed by embodiments of an apparatus implementing embodiments of multiple video processing modes and embodiments of image compression techniques.

It is noted that the embodiment illustrated in FIG. 1 is merely an example. In particular, the computer system and devices may include any combination of hardware or software that can perform the indicated functions, including computers, network devices, Internet appliances, PDAs, wireless phones, pagers, video or still cameras, etc. Computer system 100 may also be connected to other devices that are not illustrated, or instead may operate as a stand-alone system. In addition, the functionality provided by the illustrated components may, in some embodiments, be combined in fewer components or distributed in additional components. Similarly, in other embodiments, the functionality of some of the illustrated components may not be provided and/or other additional functionality may be available.

It is further noted that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 100 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 100 may be transmitted to computer system 100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM (Read-Only Memory), volatile or non-volatile media such as Random Access Memory (RAM), such as, e.g., Synchronous Dynamic RAM (SDRAM), Double Data Rate SDRAM (DDR), Static RAM (SRAM), etc.), ROM, flash, etc. In some embodiments, a computer-accessible medium may include transmission media or signals such as electrical, electromagnetic, or digital signals, conveyed via a communication medium such as network and/or a wireless link.

Figure 2:
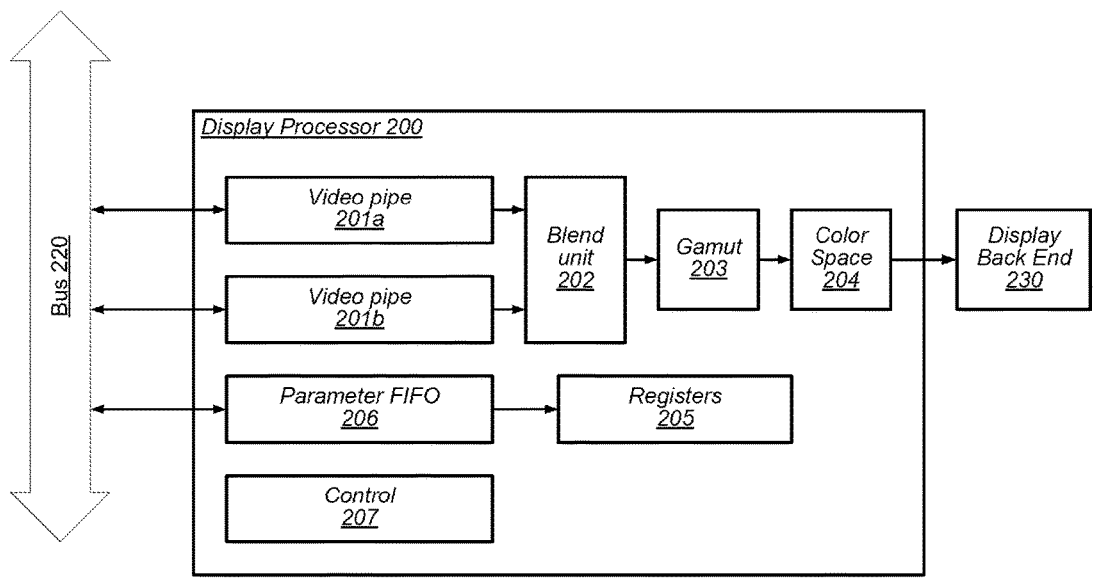
FIG. 2 illustrates a block diagram of an example embodiment of a display processor.

Turning to FIG. 2, an embodiment of a display processor is illustrated. In the illustrated embodiment, display processor 200 may be coupled to a system bus 220 and to a display back end 230. Display processor 200 may include functional sub-blocks such as one or more video pipelines 201a-b, coupled to system bus 220, blending unit 202, coupled to video pipelines 201, gamut adjustment block 203, coupled to blending unit 202, color space converter 204, coupled to gamut adjustment block 203 and coupled to display back end 230. Display processor 200 may also include control registers 205, coupled to the various sub-blocks in display controller 200, and a parameter First-In First-Out buffer (FIFO) 206, coupled to system bus 220 and control registers 205. Display processor 200 may also include control unit 207.

System bus 220, in some embodiments, may correspond to I/O interface 130 from FIG. 1. System bus 220 couples various functional blocks such that the functional blocks may pass data between one another. Display controller 200 may be coupled to system bus 220 in order to receive video frame data for processing. In some embodiments, display processor 200 may also send processed video frames to other functional blocks and or memory that may also be coupled to system bus 220.

Display back end 230 may receive processed image data as each pixel is processed by display processor 200. Display back end 230 may provide final processing to the image data before each video frame is displayed. In some embodiments, display back end may include ambient-adaptive pixel (AAP) modification, dynamic backlight control (DPB), display panel gamma correction, and dithering specific to an electronic display coupled to display back end 230.

The display processor 200 may include one or more video pipelines 201a-b. Each video pipeline 201 may fetch a video frame from a buffer coupled to system bus 220. The buffered video frame may reside in a system memory such as, for example, system memory 120 from FIG. 1. Each video pipeline 201 may fetch a distinct image and may process its image in various ways, including, but not limited to, format conversion, such as, for example, YCbCr to ARGB, image scaling, and dithering. In some embodiments, each video pipeline may process one pixel at a time, in a specific order from the video frame, outputting a stream of pixel data, maintaining the same order as pixel data passes through.

Control unit 207 may, in various embodiments, be configured to arbitrate read requests to fetch data from memory from the video pipeline 201a and video pipeline 201b. In some embodiments, video pipeline 201a and video pipeline 201b may each generate two read requests, resulting in four read requests competing for access to memory. Video pipelines 201a and 201b may, in other embodiments, assign an initial priority to each of the generated read requests. Control unit 207 may, in some embodiments, assign a priority to each request and dependent upon a display coordinate (where on a display the data to be fetch is to be shown). In various embodiments, control unit 207 may assign priorities to the read requests dependent upon any assigned initial priorities. The assigned priorities may then be used by control unit 207 to determine an order in which requests may be sent via bus 220 to memory. In some embodiments, the read requests may point to a virtual address. A memory management unit (not shown) may convert the virtual address to a physical address in memory prior to the requests being presented to the memory.

In some embodiments, control unit 207 may include a dedicated state machine or sequential logic circuit. A general purpose processor executing program instructions stored in memory may, in other embodiments, be employed to perform the functions of control unit 207.

The output from video pipelines 201 may be passed on to blending unit 202. Blending unit 202 may receive a pixel stream from one or more video pipelines. If only one pixel stream is received, blending unit 202 may simply pass the stream through to the next sub-block. However, if more than one pixel stream is received, blending unit 202 may blend the pixel colors together to create an image to be displayed. In various embodiments, blending unit 202 may be used to transition from one image to another or to display a notification window on top of an active application window. For example, a top layer video frame for a notification, such as, for a calendar reminder, may need to appear on top of, i.e., as a primary element in the display, despite a different application, an internet browser window for example. The calendar reminder may comprise some transparent or semi-transparent elements in which the browser window may be at least partially visible, which may require blending unit 202 to adjust the appearance of the browser window based on the color and transparency of the calendar reminder. The output of blending unit 202 may be a single pixel stream composite of the one or more input pixel streams.

The output of blending unit 202 may be sent to gamut adjustment unit 203. Gamut adjustment 203 may adjust the color mapping of the output of blending unit 202 to better match the available color of the intended target display.

The output of gamut adjustment unit 203 may be sent to color space converter 204. Color space converter 204 may take the pixel stream output from gamut adjustment unit 203 and convert it to a new color space. Color space converter 204 may then send the pixel stream to display back end 230 or back onto system bus 220. In other embodiments, the pixel stream may be sent to other target destinations. For example, the pixel stream may be sent to a network interface, such as network interface 140 from FIG. 1, for example. In some embodiments, new color space may be chosen based on the mix of colors after blending and gamut corrections have been applied. In further embodiments, the color space may be changed based on the intended target display.

The parameters that display processor 200 may use to control how the various sub-blocks manipulate the video frame may be stored in control registers 205. These registers may include, but not limited to, setting input and output frame sizes, setting input and output pixel formats, location of the source frames, and destination of the output (display back end 230 or system bus 220). Control registers 205 may be loaded by parameter FIFO 206.

Parameter FIFO 206 may be loaded by a host processor, a direct memory access unit, a graphics processing unit, or any other suitable processor within the computing system. In other embodiments, parameter FIFO 206 may directly fetch values from a system memory, such as, for example, system memory 120 in FIG. 1. Parameter FIFO 206 may be configured to update control registers 205 of display processor 200 before each video frame is fetched. In some embodiments, parameter FIFO may update all control registers 205 for each frame. In other embodiments, parameter FIFO may be configured to update subsets of control registers 205 including all or none for each frame.

A FIFO as used and described herein, may refer to a memory storage buffer in which data stored in the buffer is read in the same order it was written. A FIFO may be comprised of RAM or registers and may utilize pointers to the first and last entries in the FIFO.

It is noted that the display processor illustrated in FIG. 2 is merely an example. In other embodiments, different functional blocks and different configurations of functions blocks may be possible dependent upon the specific application for which the display processor is intended. For example, more than two video pipelines may be included.

Figure 3:
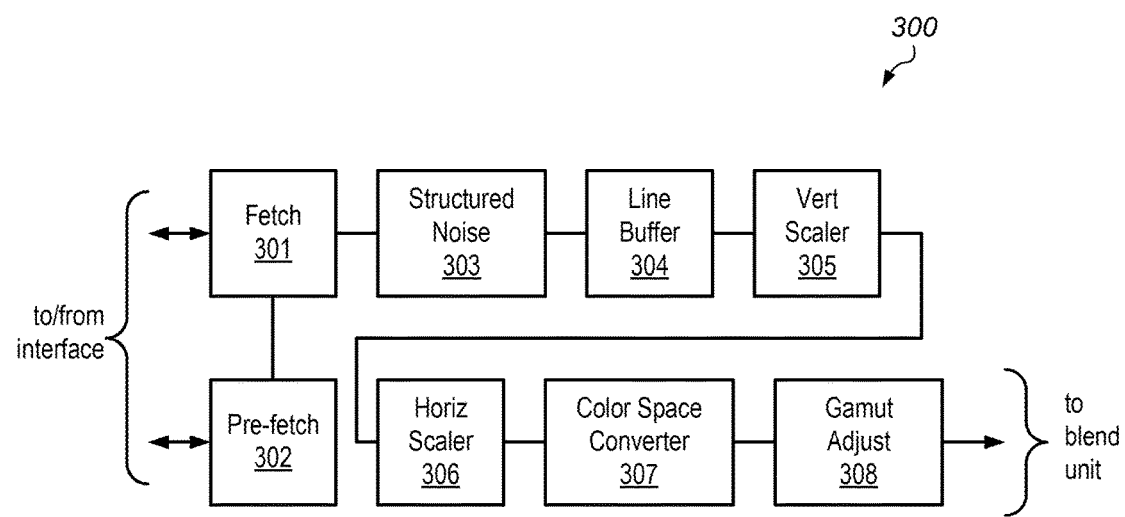
FIG. 3 illustrates an embodiment of a video pipeline.

Turning to FIG. 3, an embodiment of a video pipeline is illustrated. In some embodiments, video pipeline 300 may correspond to video pipelines 201a and 201b of display processor 200 as illustrated in FIG. 2. In the illustrated embodiment, video pipeline 300 includes fetch unit 301, pre-fetch unit 302, structure noise unit 303, line buffer 304, vertical scaler 305, horizontal scaler 306, color space converter 307, and gamut adjust unit 308. In general, video pipeline 300 may be responsible for fetching pixel data for source frames stored in a memory, and then processing the fetched data before sending the processed data to a blend unit, such as, blend unit 202 of display processor 200 as illustrated in FIG. 2.

Fetch unit 301 and pre-fetch unit 302 may, in some embodiments, be configured to generate read requests for source pixel data needed by video pipeline 300. In some embodiments, the order in which read request are sent memory (also referred to as a "source buffer") may be dependent upon a number of source buffer lines needed to generate an output line of a destination frame. Request the source lines, i.e., fetching the source lines from the source buffer, is commonly referred to as a "pass" of the source buffer.

In some embodiments, only data contained in one line of a source buffer may be needed when processing the beginning of a frame. An initial pass of the source buffer may, in various embodiments, include a fetch of as many as nine lines from the source buffer. In other embodiments, subsequent passes through of the source buffer may fetch may require less lines. During each pass of the source buffer, required portions or blocks of data may be fetched from top to bottom, then from left to right, where "top," "bottom," "left," and "right" are in reference to a display.

Each read request may include one or more addresses indicating where the portion of data is stored in memory, i.e., a source buffer. In some embodiments, address information included in the read requests may be directed towards a virtual (also referred to herein as "logical") address space, i.e., an addresses scheme that does not directly point to physical locations within a memory device, but rather is a simplified address space unique to a given processing process, such as, display processing, for example. In such cases, the virtual addresses may be mapped to physical addresses before the read requests are sent to the source buffer. A memory management unit may, in some embodiments, be used to map the virtual addresses to physical addresses. In some embodiments, the memory management unit may be included within the display processor, while in other embodiments, the memory management unit may be located elsewhere within a computing system.

Structured noise unit 303 may, in various embodiments, provide structured noise dithering on the Luma channel of YCbCr formatted data. Other channels, such as, e.g., the chroma channels of YCbCr, and other formats, such as, e.g., ARGB may not be dithered. In various embodiments, structured noise unit 303 may apply a two-dimensional array of Gaussian noise (i.e., statistical noise that is normally distributed) to blocks of the source frame data. A block of source frame data may, in some embodiments, include one or more source pixels. The noise may be applied to raw source data fetched from memory prior to scaling.

Line buffer 304 may be configured to store a line of a source frame. The line may include data indicative of luminance and chrominance of individual pixels included within the line. Line buffer 304 may be designed in accordance with one of various design styles. For example, line buffer 304 may be a SRAM, DRAM, or any other suitable memory type. In some embodiments, line buffer 304 may include a single input/output port, while, in other embodiments, line buffer 304 may have multiple data input/output ports.

In some embodiments, scaling of source pixels may be performed in two steps. The first step may perform a vertical scaling, and the second step may perform a horizontal scaling. In the illustrated embodiment, vertical scaler 305 and horizontal scaler 306 may perform the vertical and horizontal scaling, respectively. Vertical scaler 305 and horizontal scaler 306 may be designed according to one of varying design styles. In some embodiments, vertical scaler 305 and horizontal scaler 306 may be implemented as a 9-tap 32-phase filters. Such a multi-phase filter may, in various embodiments, multiply each pixel retrieved by fetch unit 302 by a weighting factor. The results pixel values may then be added, and then rounded to form a scaled pixel. The selection of pixels to be used in the scaling process may be a function of a portion of a scale position value. In some embodiments, the weighting factors may be stored in a programmable table, and the selection of the weighting factors to use in the scaling may be a function of a different portion of the scale position value.

In some embodiments, the scale position value (also referred to herein as the "display position value"), may included multiple portions. For example, the scale position value may include an integer portion and a fractional portion. In some embodiments, the determination of which pixels to scale may depend on the integer portion of the scale position value, and the selecting of weighting factors may depend on the fractional portion of the scale position value. A Digital Differential Analyzer, as described below in more detail in regards to FIG. 4, may, in various embodiments, be used to determine the scale position value.

Color management within video pipeline 300 may be performed by color space converter 307 and gamut adjust unit 308. In some embodiments, color space converter 307 may be configured YCbCr source data to the RGB format. Alternatively, color space converter may be configured to remove offsets from source data in the RGB format. Color space converter 307 may, in various embodiments, include a variety of functional blocks, such as, e.g., an input offset unit, a matrix multiplier, and an output offset unit (all not shown). The use of such blocks may allow the conversion from YCbCr format to RGB format and vice-versa.

Gamut adjust unit 308 may, in various embodiments, be configured to convert pixels from a non-linear color space to a linear color space, and vice-versa. In some embodiments, gamut adjust unit 308 may include a Look Up Table (LUT) and an interpolation unit. The LUT may, in some embodiments, be programmable and be designed according to one of various design styles. For example, the LUT may include a SRAM or DRAM, or any other suitable memory circuit. In some embodiments, multiple LUTs may be employed. For example, separate LUTs may be used for Gamma and De-Gamma calculations.

It is note that the embodiment illustrated in FIG. 3 is merely an example. In other embodiments, different functional blocks and different configurations of functional blocks are possible and contemplated.

Figure 4:
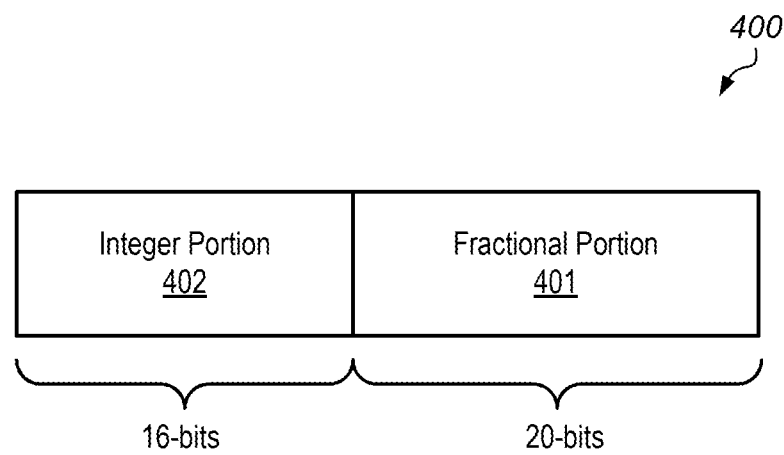
FIG. 4 illustrates an embodiment of a digital differential analyzer.

An embodiment of a Digital Differential Analyzer (DDA) is illustrated in FIG. 4. In the illustrated embodiment, DDA 400 includes a 36-bit register which may be configured to store 36-bit fixed point number in two's complement format. In some embodiments, the 36-bit fixed point number may include an integer portion and a fraction portion. DDA 400 may, in some embodiments, be divided into two portions such as, e.g., fractional portion 401 and integer portion 402, each of which may be configured to stored respective portions of the fixed point number. In some embodiments, the number stored in DDA 400 may be rounded. When rounding is performed, the fractional portion of the number may be rounded first, and the result of rounding the fractional portion may be used when rounding the integer portion of the fixed point number.

During operation, DDA 400 may be initialized with a starting value. As described above in regards to vertical scaler 305 and horizontal scaler 306, multi-tap polyphase filter may be performed using the values stored in fractional portion 401 and integer portion 402 of DDA 400. A step value may then be added to the value stored in DDA 400. In some embodiments, a step value less than may indicate that a given component (i.e., a portion of source pixel data) may be upscaled. A step value greater than one may indicate, in other embodiments, that a given component may be downscaled. In various embodiments, luminance and chrominance values of YCbCr format pixel data may be scaled individually.

DDA 400 may be designed according to one of various design styles. In some embodiments, DDA 400 may include multiple latches, flip-flops, or any other suitable storage circuit coupled together in parallel to form the bit width necessary to store the fixed point number. Such latches and flip-flops may be particular embodiments of a storage circuits configured to store a single data bit, and may in various embodiments, be configured to operate synchronously or asynchronously. In some embodiments, the latches or flip-flops may be configured to reset to a predetermined value, such as a logical 0. It is noted that a "logical 0" (also referred to as a "low" or "low logic level") refers to a voltage at or near ground potential and that a "logical 1" (also referred to as a "high" or "high logic level") refers to a voltage level sufficiently large to activate an n-channel Metal-Oxide Semiconductor Field-Effect Transistor (MOSFET). In other embodiments, different technology may result in different voltage levels for "low" and "high."

It is noted that the embodiment of a DDA depicted in FIG. 4 is one of many possible embodiments. In other embodiments, different bit widths and different configurations of bits within the register may be employed.

Figure 5:
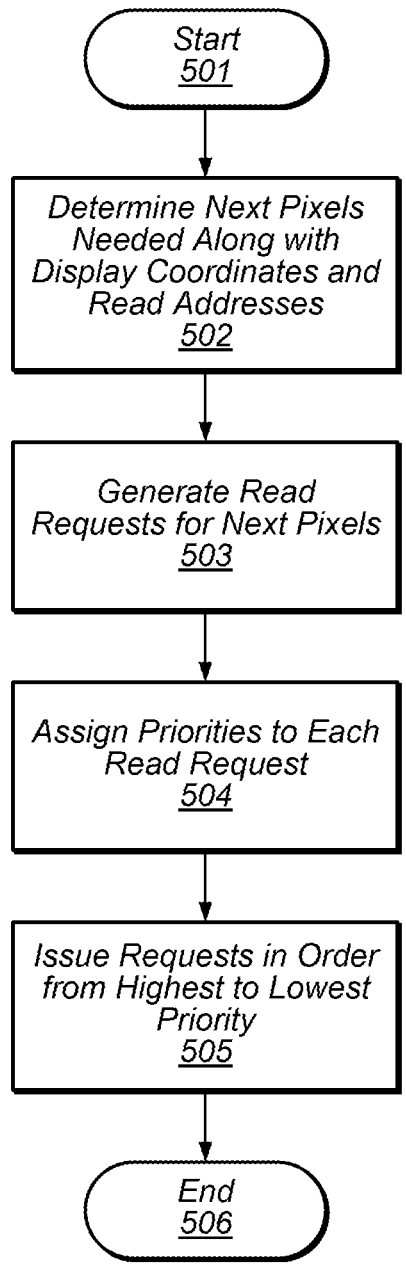
FIG. 5 illustrates a flowchart depicting of an embodiment of a method arbitrating multiple read requests.

Turning to FIG. 5, a flowchart depicting an embodiment of a method for arbitrating read requests is illustrated. Referring collectively to display processor 200 as illustrated in FIG. 2 and the flowchart of FIG. 5, the method begins in block 501. Video pipelines 201a and 201b may each determine a next pixel to be displayed for the portion of the image data each pipeline is processing (block 502). In some embodiments, each of the aforementioned video pipelines may also determine display coordinates (also referred to herein as an "output coordinate") and read address, i.e., address locations in memory for the next pixel data, corresponding to the determined next pixels. The stored data may, in various embodiments, be stored in one of numerous formats such as, YCbCr, for example.

The calculation of the display coordinates may, in some embodiments, depend on a scale factor and a step applied within each DDA of video pipelines 201a and 201b. In some embodiments, when the scale factor is one, i.e., the source pixel data does not need to be scaled, the display region may equal the source region and a separate calculation of display coordinates may not be necessary.

In some embodiments, a display coordinate may include an x-component and a y-component. Each of video pipelines 201a and 201b may perform separate calculations for the x-component and y-component of the display coordinate. In some embodiments, the inverse of the horizontal step within the DDA units may be used to determine the x-component. The size of a pixel, an offset in the destination, and scaling factors (both horizontal and vertical) may also be used in the course of calculating the x-component and y-component of the display coordinate.

Once the next pixels have been determined, video pipelines 201a and 201b may then generate read requests to fetch the necessary stored pixel data from memory (block 503). In some embodiments, each read request may include the determined read address. An initial priority may, in various embodiments, be assigned to each read request by a respective video pipeline. The initial priority may be dependent upon a previously determined display coordinate.

Once the read requests have been generated, control unit 207 may then assign a priority to each read request dependent upon the calculated display coordinates (block 504). In some embodiments, display coordinates with a smaller value, i.e., an earliest pixel coordinate within a scan line may be given a higher priority. In some embodiments, the x-component and y-component within the display coordinates may be evaluated separately, and the y-component value of a display coordinate may be given a larger weight when determining a priority of the corresponding read request. In various embodiments, control unit 207 may use any initial priorities assigned to a read request during the process of determining a priority for the read request.

With priorities assigned to the read requests, the read requests may then be issued to memory via bus 220 in order from highest priority to lowest priority (block 505). In some embodiments, each request includes a virtual address corresponding to the location of the desired data. A memory management unit may, in such cases, translate such virtual addresses to physical addresses before sending the requests to memory. With each read request sent to memory, the method may then conclude in block 506.

It is noted that the method depicted in the flowchart illustrated in FIG. 5 is merely an example and that some of the operations are depicted as being performed in a sequential fashion. In other embodiments, one or more of the operations may be performed in parallel.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   a first video processing pipeline including a first plurality of circuit blocks, wherein the first video processing pipeline is configured to generate a first plurality of read requests to fetch a respective one of a first plurality of portions of stored pixel data;
   a second video processing pipeline including a second plurality of circuit blocks, wherein the second video processing pipeline is configured to generate a second plurality of read requests to fetch a respective one of a second plurality of portions of the stored pixel data;
   wherein each portion of the first plurality of portions of the stored pixel data and the second plurality of portions of the stored pixel data corresponds to one or more pixels; and
   a control unit, including at least a sequential logic circuit, coupled to the first video processing pipeline and the second video processing pipeline, wherein the control unit is configured to:

select a subset of the one or more pixels using a first portion of a scale position value;
determine respective display coordinates for each one of the one or more pixels for each of the respective plurality of the stored pixel data using the scale position value;
determine a first weight and a second weight using a fractional portion of the scale position value;
determine a priority for each read request of the first plurality of read requests and the second plurality of read requests using the respective display coordinates of each one of the one or more pixels for each of the respective plurality of portions of the stored pixel data, wherein the respective display coordinates of each one of the one or more pixels includes a first component with the first weight and a second component with the second weight; and
determine an order for each read request of the first plurality of read requests and the second plurality of read requests in which to fetch the respective portions of stored pixel data dependent upon the determined priority for each read request.

2. The apparatus of claim 1, wherein the first video processing pipeline is further configured to assign a respective one of a first plurality of initial priorities to each of the first plurality of read requests, and the second video processing pipeline is further configured to assign a respective one of a second plurality of initial priorities to each of the second plurality of read requests, and wherein to determine a priority for each read requests of the first plurality of read requests and the second plurality of read requests, the control unit is further configured to determine a priority for each read request of the first plurality of read requests and the second plurality of read requests dependent upon the assigned first and second pluralities of initial priorities.

3. The apparatus of claim 1, wherein to determine the priority for each read request of the first plurality of read requests and second plurality of read requests, the control unit is further configured to:
determine a pixel with a smallest display coordinate of the one or more pixels for each of the respective portions of the stored pixel data; and
calculate the display coordinate of the determined pixel.

4. The apparatus of claim 1, wherein to determine the priority for each read request of the first plurality of read requests and the second plurality of read requests, the control unit is further configured to assign a first priority to a first read request with a first display coordinate and assign a second priority to a second read request with a second display coordinate, wherein the first priority is higher than the second priority, and the first display coordinate is less than the second display coordinate.

5. A method, comprising:
generating a plurality of read requests to fetch a respective plurality of portions of stored pixel data, wherein each one of the respective plurality of portions of the stored pixel data correspond to one of more pixels;
selecting a subset of the one or more pixels using a first portion of a scale position value;
determining respective display coordinates for each one of the one or more pixels for each of the respective plurality of the stored pixel data using the scale position value;
determining a first weight and a second weight using a fractional portion of the scale position value;
determining a priority for each read request of the plurality of read requests dependent upon the respective display coordinates of each one of the one or more pixels of each one of the respective plurality of portions of the stored pixel data, wherein the respective display coordinates of each of the one or more pixels include a first component and a second component, and wherein the priority of a given read request is dependent upon the first weight of the first component and the second weight of the second component; and
determining an order for the plurality of read requests to fetch the respective portions of the stored pixel data dependent upon the determined priority for each read request.

6. The method of claim 5, further comprising sending each read request of the plurality read requests to a memory according to the determined order.

7. The method of claim 6, wherein sending each read request of the plurality of read requests to the memory comprises translating a virtual address to a physical address of the memory.

8. The method of claim 5, wherein determining the priority for each read request of the plurality of read requests comprises:
determining a pixel with a smallest display coordinate of the one or more pixels for each of the respective plurality of portions of stored pixel data; and
calculating the display coordinate of the determined pixel.

9. The method of claim 5, wherein determining the priority for each read request of the plurality of read requests comprises assigning a first priority to a first read request with a first display coordinate and assigning a second priority to a second read request with a second display coordinate, wherein the first priority is higher than the second priority, and wherein pixel data corresponding to the first display coordinate will be displayed earlier than pixel data corresponding to the second display coordinate.

10. The method of claim 5, further comprising scaling pixel data using the scale position value.

11. A system, comprising:
a memory configured to store pixel data; and
a display processing unit coupled to the memory, wherein the display processing unit is configured to:
generate a plurality of read requests to fetch a respective plurality of portions of stored pixel data, wherein the respective plurality of portions of the stored pixel data correspond to one or more pixels;
select a subset of the one or more pixels using a first portion of a scale position value;
determine respective display coordinates for each one of the one or more pixels for each of the respective plurality of the stored pixel data using the scale position value;
determine a first weight and a second weight using a fractional portion of the scale position value;
determine a priority for each read request of the plurality of read requests using the respective display coordinates of each one of the one or more pixels for each of the respective plurality of portions of stored pixel data, wherein display coordinates of a given pixel of the one or more pixels includes a first component with the first weight and a second component with the second weight; and
determine an order for the plurality of read request to fetch the respective portions of stored pixel data dependent upon the determined priority for each read request.

12. The system of claim 11, wherein to determine the priority for each read request of the plurality of read requests, the display processing unit is further configured to:
   determine a pixel with a smallest display coordinate of the one or more pixels for each of the respective plurality of portions of stored pixel data; and
   calculate the display coordinate of the determined pixel.

13. The system of claim 11, wherein to determine the priority for each read request of the plurality of read requests, the display processing unit is further configured to assign a first priority to first read request with a first display coordinate and assign a second priority to a second read request with a second display coordinate, wherein the first priority is higher than the second priority, and pixel data corresponding to the first display coordinate will be displayed earlier than pixel data corresponding to the second display coordinate.

14. The system of claim 11, wherein the display processing unit is further configured to send each request of the plurality of read requests to the memory according to the determined order.

15. A system, comprising:
   a memory configured to store pixel data;
   a display processing unit coupled to the memory, wherein the display processing unit is configured to:
      generate a plurality of read requests to fetch a respective plurality of portions of stored pixel data, wherein the respective plurality of portions of the stored pixel data correspond to one of more pixels;
      select a subset of the one or more pixels using a first portion of a scale position value;
      determine respective display coordinates for each one of the one or more pixels for each of the respective plurality of the stored pixel data using the scale position value;
      determine a first weight and a second weight using a fractional portion of the scale position value;
      determine a priority for each read request of the plurality of read requests dependent upon the respective display coordinates of each of the one or more pixels for each of the respective plurality of portions of stored pixel data, wherein the display coordinates of a given pixel of the one or more pixels includes a first component with the first weight and second component with the second weight; and
      determine an order for the plurality of read request to fetch the respective portions of stored pixel data dependent upon the determined priority for each read request.

* * * * *